April 23, 1940.  W. C. ELZE ET AL  2,197,971
LIQUID STRAINER
Filed Dec. 31, 1937  3 Sheets-Sheet 1
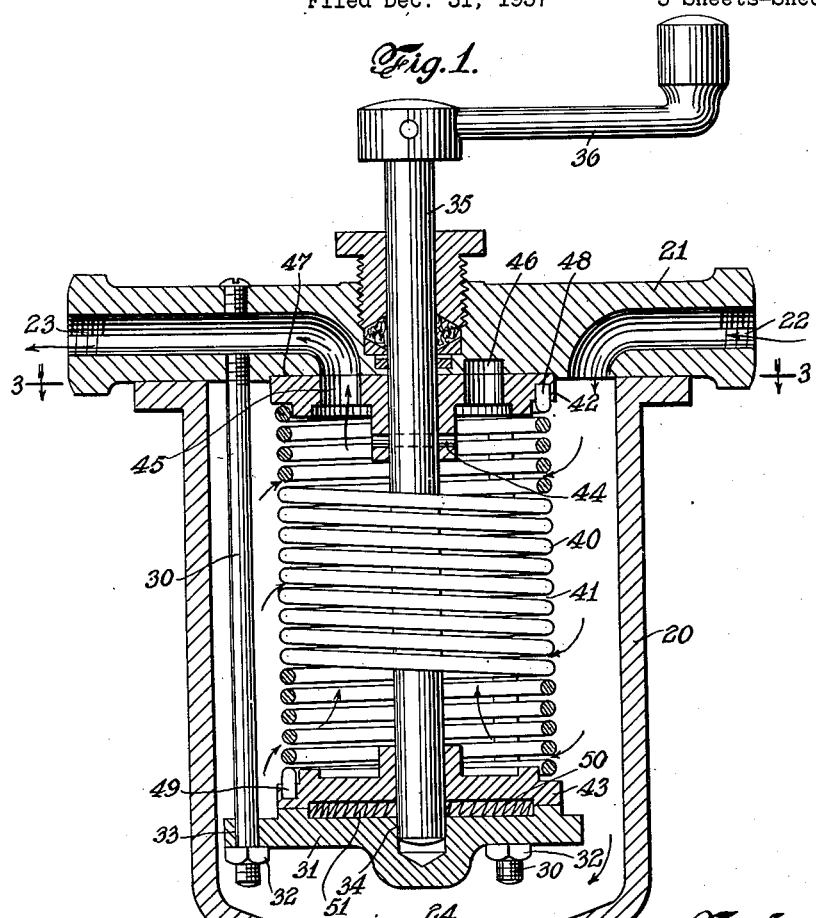
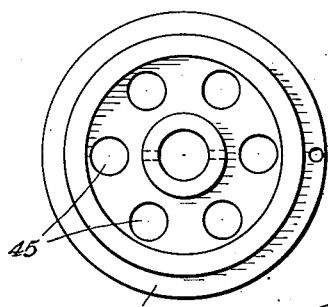
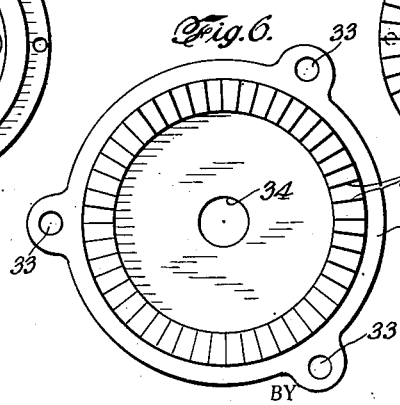
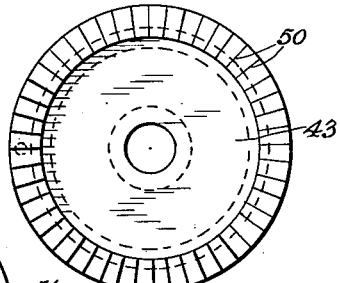
INVENTORS
WALTER C. ELZE AND
IRVING McDOWELL
BY
ATTORNEY.

April 23, 1940.  W. C. ELZE ET AL  2,197,971
LIQUID STRAINER
Filed Dec. 31, 1937  3 Sheets-Sheet 2

INVENTORS
WALTER C. ELZE AND
IRVING MCDOWELL
BY
ATTORNEY.

April 23, 1940.  W. C. ELZE ET AL  2,197,971
LIQUID STRAINER
Filed Dec. 31, 1937  3 Sheets-Sheet 3
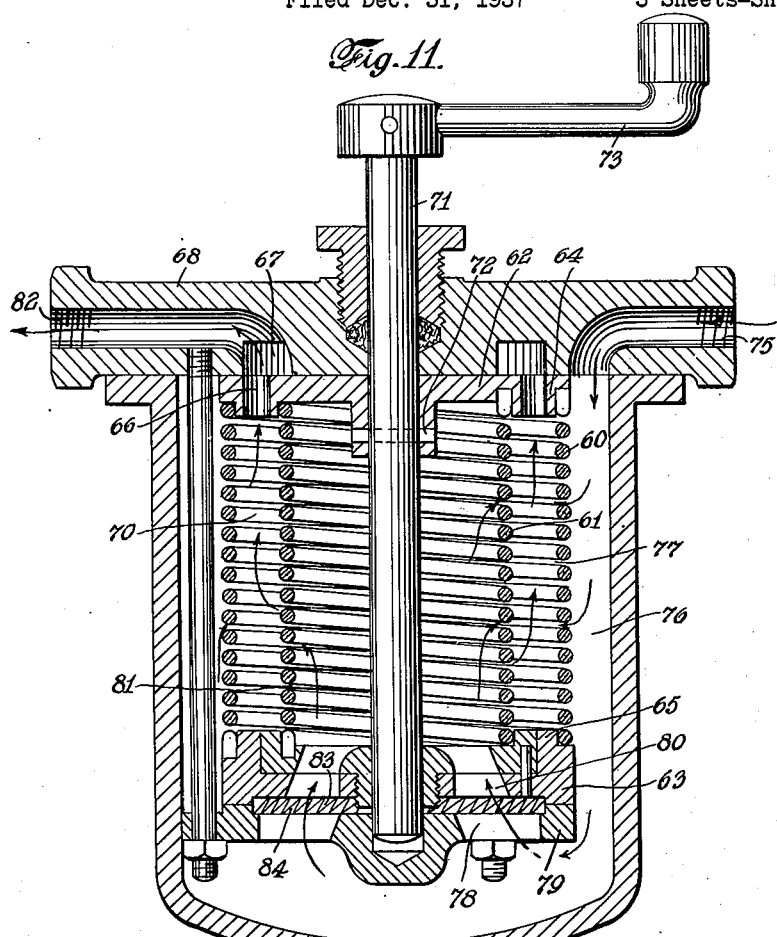
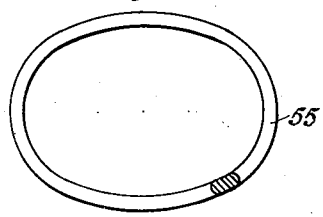
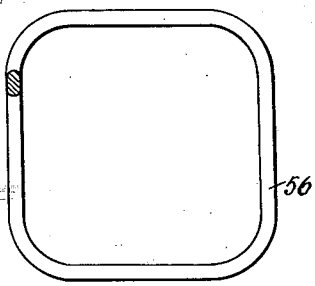
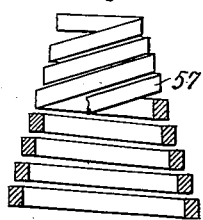
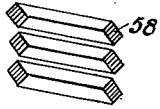
INVENTORS
WALTER C. ELZE AND
IRVING McDOWELL
BY
ATTORNEY.

Patented Apr. 23, 1940

2,197,971

UNITED STATES PATENT OFFICE 2,197,971

LIQUID STRAINER

Walter C. Elze, Forest Hills, and Irving McDowell, Valley Stream, N. Y., assignors to Hauck Manufacturing Company, Brooklyn, N. Y., a corporation of New York Application December 31, 1937, Serial No. 182,848

9 Claims. (Cl. 210—167)

The invention relates to strainer devices, more especially to a strainer for oil and similar viscid liquids, gasoline, etc., and bearing in suspension small amounts of foreign matter which must be filtered out therefrom before the liquid is suitable for certain uses.

The invention has for an object a novel strainer device wherein the strainer element thereof may be agitated in a manner to clean the same of any adhering foreign matter by the simple expedient of imparting to said element a momentary partial rotation, or a succession of the same.

A further object of the invention resides in the provision of a strainer device wherein the effective straining surface may be materially increased without enlarging the enclosing casing therefor.

Still another object of the invention is to provide in a strainer element a helical spring or springs of separated convolutions, together with means whereby the degree of separation may be adjusted to suit the filtering requirements.

In carrying out the invention, there is mounted within a suitable casing a strainer element in the nature of a helical spring with separated convolutions, said spring being rotatably carried, for example, by a removable head for the casing and which head is provided with inlet and outlet ports, the former port communicating with the interior of said casing. The said spring is held at its head end, and, through an apertured disk affording communication between the interior of the spring and the outlet port, is connected to a rotatable spindle carried by the head; and at its opposite end it is held to a rotatable disk through which the spindle passes, the latter being mounted axially of the said coiled spring.

Provision is made, as by means of a block beyond the rotatably located disk and adjustable with respect to the head, for compressing the spring between said disks to the desired extent to restrict the space between the respective convolutions in accordance with the desired filtering action.

Furthermore, the rotatable disk to which the one end of the spring is held is provided on its outer face with means adapted to engage complementary means on the adjacent face of the block whereby the spring may be compressed temporarily, said means being constructed for checking rotation of said disk in one direction. Thereby, when the spindle is rotated, the corresponding end of the spring will tend to wind up and close the convolutions, crushing at the same time any solid matter which may have located between said convolutions. When the spring is again released and under its tension, a sudden expansion or opening of the convolutions will occur as well as a centrifugal action for dislodging any adhering particles of foreign matter or incrustations collected in the straining of liquid which has passed through the spring. This is enhanced as a result of the momentary contraction in diameter of the spring and its subsequent expansion, as well as by vibration of the spring convolutions in returning to their normal position of rest.

By providing a plurality of springs and nesting one spring within another, both being mounted for rotation with the spindle, there is afforded between the two springs a cylindrical annular chamber into which the liquid may be introduced through both the outer spring and the inner one. Communication is then had for delivering the filtered liquid from this chamber, as through apertures provided in the disk attached to the spindle to an annular port of the head, to the outlet port of said head also in communication with the annular port.

The nature of the invention, however, will best be understood when described in connection with the accompanying drawings, in which:

Fig. 1 is a vertical section through the novel strainer device.

Fig. 4 is an underneath view of one of the disks between which the strainer element is retained; and Fig. 5 is a similar view of the other disk.

Fig. 6 is a plan view of the block for mounting the strainer element and which cooperates with the lower retaining disk.

Figs. 7 and 8 are plan views illustrating different forms of strainer elements.

Figs. 9 and 10 illustrate further modifications in the strainer element, Fig. 9 being a partial elevation and vertical section of such element, and Fig. 10 a fragmentary longitudinal section thereof.

Fig. 11 is a vertical section through the strainer device illustrating a further modification therein.

Figure 2:
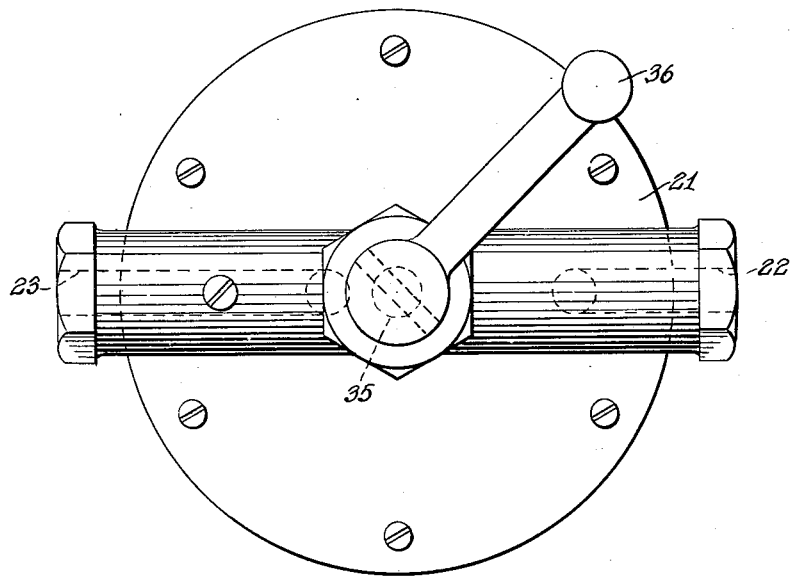
Fig. 2 is a plan thereof.
Figure 3:
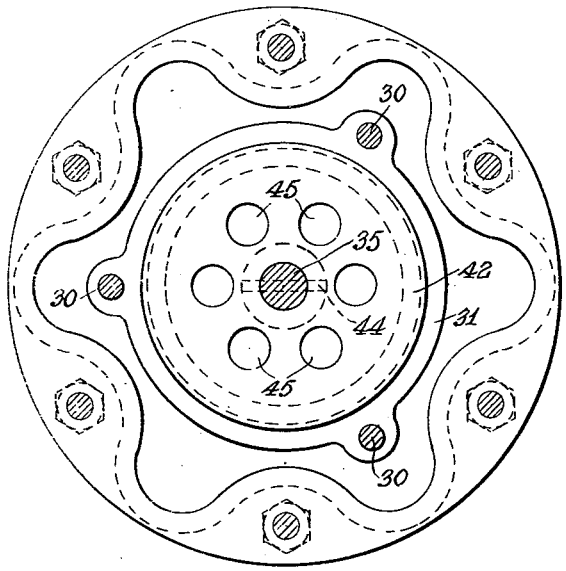
Fig. 3 is a horizontal section taken on the line 3—3, Fig. 1 of the drawings, and looking in the direction of the arrows.

Referring to the drawings, more particularly Figs. 1-6, a sealed receptacle is provided for receiving the strainer means and comprises, for example, a cylindrical casing 20 closed at the top by a head 21 provided with the inlet 22 which is shown as communicating directly with the interior of the casing. A further communication is provided in the head, as the outlet 23, which communicates indirectly with the interior of the casing, as is hereinafter more fully set forth. The bottom of the casing is provided with an opening 24 closed by a drain plug 25 through which sludge or the like accumulating in the bottom of the casing may readily be removed by unscrewing the plug and draining the casing contents.

The novel strainer mechanism is mounted within the receptacle in a manner to be removable therefrom as a whole, for example, in being carried by the head 21. To this end, a plurality of rods 30 depend from the underface of said head into the casing 20 and at the bottom adjustably support a block 31 through nuts 32 operating over the lower threaded ends of the respective rods which pass through corresponding openings 33 of the block. The said block provides also a bearing 34 for a spindle 35 rotatably mounted in the head 21, said spindle being preferably axially disposed with respect to the casing and extending outwardly beyond the head 21 to receive a handle or like member 36 whereby rotation may be imparted to said spindle. There is arranged to rotate with the said spindle 35 a strainer element in the nature of a helical spring 40 which is coiled so as to afford interstices between the convolutions providing for a helically continuous opening 41 for passing the liquid to be strained through the strainer. Said spring is held between an upper disk 42 and a lower disk 43, the former being fixed as by means of a pin 44 to the said spindle. It is provided, also, with a plurality of openings or apertures 45 juxtaposed to an annular port 46 formed in the underface of head 21 and in communication with the outlet 23 thereof, said disk being held in contact with the said underface of the head in a recess 47 thereof under the action of the spring, as hereinafter set forth.

The lower disk 43 is rotatably located about the lower end of spindle 35 and is supported upon the block 31. Spring 40 is thus positioned between the two disks and its respective ends 48 and 49 are held therein so that said spring and disk will partake of any angular movement imparted to the spindle 35. Furthermore, by adjusting the block 31 axially on its supporting rods 30, the opening 41 may be varied to suit the degree of filtering desired, the convolutions being more or less contracted in accordance with the position of said block.

As shown in the drawings, provision is made for compressing the spring and checking in one direction the rotation of the rotatably located disk 43, as by providing on the underface thereof ratchet teeth 50 which are preferably undercut and engage complementary ratchet teeth 51 provided on the upper or inner face of block 31. By this expedient, in turning the handle 36, the spring 40 may be momentarily contracted and expanded as the teeth of one set ride over those of the other, tending to dislodge any adhering sludge or incrustations of foreign matter collected in the straining of the liquid which has passed through the strainer—the course of the liquid through the novel strainer device being indicated by the arrows, entering the inlet 22 to pass into the interior of casing 20, through the opening 41, thence through the interior of the spring 40, the openings 45 in disk 42, the annular port 46, and finally out through the outlet 23.

While the spring 40 serving as the strainer element has been indicated as being circular in cross-section, this is not essential and various conformations of the spring may be had. For example, in Fig. 7 the spring 55 is shown as of eliptical contour, while in Fig. 8 the spring 56 is of rectangular conformation. Fig. 9 illustrates further modifications in the spring in that its convolutions 57 may be wound in such a manner as to afford a conical strainer; and the cross-section of the convolutions is shown rectangular rather than circular, whereby a surface contact between convolutions is possible instead of a line contact. Fig. 10 illustrates a still different form of the cross-section of the convolutions 58 which, while rectangular in section, are so disposed that a line contact may be had between the convolutions, providing wedge-shaped entrances and exits.

The invention is also not restricted to the use of but a single filtering element; and as shown in Fig. 11, a plurality of spring elements 60 and 61 are provided. These springs are nested the one within the other, and are carried between an upper disk 62 and a lower disk 63. Both disks are provided with annular ridges 64 and 65, respectively, apertures or openings 66 extending through the former ridge to afford communication with an annular port 67 in the underface of head 68, as in the previously described embodiment. The apertures 66 communicate with an annular cylindrical chamber 70 provided between the two springs 60 and 61 whose respective ends are mounted over the corresponding ridges and are attached to the respective disks as in the previously described embodiment. Both springs, together with their disks, will therefore partake of any rotation of spindle 71 to which disk 62 is secured by means of pin 72, said spindle being rotatable, for example, by means of handle 73.

The course of liquid to be strained is indicated by the arrow, said liquid passing through the inlet port 75 to the interior 76 of the casing through opening 77 of spring 60 to the interior of chamber 70; also, through opening 78 in block 79 and registering openings 80 in disk 63 to the interior of spring 61, and through the opening 81 thereof also into the interior of chamber 70. From this chamber the liquid, after being strained by passing through the openings 77 and 81, passes out of the chamber through the opening 66 and port 67 to the outlet 82 of the head 68.

Complementary ratchet teeth 83 and 84 are provided, as in the previously described embodiment, on the lower disk 63 and the block 79 respectively for agitating the springs 60 and 61.

We claim:

1. A strainer, comprising a casing, a head sealing the same and having an inlet and an outlet the former communicating directly with the interior of the casing and said head being provided with an annular port in its under face in communication with the said outlet, a spindle rotatably mounted in the head and extending within the casing, a block carried by the head within the casing, means to adjust the block axially of said spindle, a helical spring with separated convolutions and carried by the spindle between said head and said block, said spring being mounted on the spindle for rotation of one end therewith, together with means movable with said spring whereby the latter is compressed and subsequently released upon rotation, and means to rotate said spindle.

2. A strainer, comprising a casing, a head sealing the same and having an inlet and an outlet, the former communicating directly with the interior of the casing and said head being provided with an annular port in its under face in communication with the said outlet, a spindle rotatably mounted in the head and extending within the casing, a block carried by the head within the casing, upper and lower disks mounted upon the spindle between the said head and block, the one disk being attached to the spindle immediately below the inner face of the head and having apertures therein juxtaposed to said annular port of the head, and the other disk being rotatably located about the innermost end of the spindle immediately above said block, a helical spring with separated convolutions and mounted on said spindle between said disks and attached thereto, said block and rotatably located disk bearing juxtaposed means adapted for engagement to compress the spring and to check rotation of the said rotatably located disk in one direction of its rotation, and means to rotate the spindle.

3. A strainer, comprising a casing, a head sealing the same and having an inlet and an outlet, the former communicating directly with the interior of the casing and said head being provided with an annular port in its under face in communication with the said outlet, a spindle rotatably mounted in the head and extending within the casing, a block carried by the head within the casing, upper and lower disks mounted upon the spindle between the said head and block, the one disk being attached to the spindle immediately below the inner face of the head and having apertures therein juxtaposed to said annular port of the head, and the other disk being rotatably located about the innermost end of the spindle immediately above said block, a helical spring with separated convolutions and mounted on said spindle between said disks and attached thereto, the under face of the rotatably located disk being provided with ratchet teeth engaging corresponding teeth provided upon the inner face of the said block, and means to rotate the spindle.

4. A strainer, comprising a casing, a head sealing the same and having an inlet and an outlet, the former communicating directly with the interior of the casing and said head being provided with an annular port in its under face in communication with the said outlet, a spindle rotatably mounted in the head and extending within the casing, a block carried by the head within the casing, upper and lower disks mounted upon the spindle between the said head and block, the one disk being attached to the spindle immediately below the inner face of the head and having apertures therein juxtaposed to said annular port of the head, and the other disk being rotatably located about the innermost end of the spindle immediately above said block, a helical spring with separated convolutions and mounted on said spindle between said disks and attached thereto, the under face of the rotatably located disk being provided with undercut ratchet teeth engaging corresponding teeth provided upon the inner face of the said block, and means to rotate the spindle.

5. A strainer, comprising a casing, a head sealing the same and having an inlet and an outlet, the former communicating directly with the interior of the casing and said head being provided with an annular port in its under face in communication with the said outlet, a spindle rotatably mounted in the head and extending axially within the casing, a block carried by the head within the casing affording a bearing for the inner end of the spindle, means to adjust the block axially of said spindle, upper and lower disks mounted upon the spindle between the said head and block, the one disk being attached to the spindle immediately below the inner face of the head and having apertures therein juxtaposed to said annular port of the head, and the other disk being rotatably located about the innermost end of the spindle immediately above said block, a helical spring with separated convolutions and mounted on said spindle between said disks and attached thereto, the under face of the rotatably located disk being provided with ratchet teeth engaging corresponding teeth provided upon the inner face of the said block, and means to rotate the spindle.

6. A strainer, comprising a casing, a head sealing the same and having an inlet and an outlet, the former communicating directly with the interior of the casing and said head being provided with an annular port in its under face in communication with the said outlet, a spindle rotatably mounted in the head and extending within the casing, a block carried by the head within the casing, upper and lower disks mounted upon the spindle between the said head and block, the one disk being attached to the spindle immediately below the inner face of the head and having apertures therein juxtaposed to said annular port of the head, the said apertured disk being provided on its under face with an annular ridge through which the apertures extend, and a pair of coaxially mounted springs nested over said ridge between the said disks and attached thereto, said springs affording a cylindrical annular chamber communicating with the apertures of said apertured disk, the interior of the innermost spring and the exterior of the outermost springs being in communication with the interior of the casing, and means to rotate said spindle.

7. A strainer, comprising a casing, a head sealing the same and having an inlet and an outlet, the former communicating directly with the interior of the casing and said head being provided with an annular port in its under face in communication with the said outlet, a spindle rotatably mounted in the head and extending within the casing, an apertured block carried by the head within the casing, upper and lower disks mounted upon the spindle between the said head and block, and one disk being attached to the spindle immediately below the inner face of the head and having apertures therein juxtaposed to said annular port of the head, the said apertured disk being provided on its under face with an annular ridge through which the apertures extend, and the other disk being rotatable about the axis of the spindle having an aperture registering with the aperture of the block, and a pair of coaxially mounted springs nested over said ridge between the disks to afford a cylindrical annular chamber communicating with the apertures of said apertured disk, the exterior of the outermost spring being in communication with the interior of the casing and the interior of the innermost spring being in communication therewith through the said apertures provided in the rotatably located disk and the block, and means to rotate said spindle.

8. A strainer, comprising a casing, a head sealing the same and having an inlet and an outlet, the former communicating directly with the interior of the casing and said head being provided with an annular port in its under face in communication with the said outlet, a spindle rotatably mounted in the head and extending axially within the casing, an apertured block carried by the head within the casing affording a bearing for the inner end of the spindle, means to adjust the block axially of said spindle, upper and lower disks mounted upon the spindle between the said head and block, the one disk being attached to the spindle immediately below the inner face of the head and having apertures therein juxtaposed to said annular port of the head, the said apertured disk being provided on its underface with an annular ridge through which the apertures extend and the other disk being rotatable about the axis of the spindle and having an aperture registering with the aperture of the block, and a pair of coaxially mounted springs nested over said ridge between the disks to afford a cylindrical annular chamber communicating with the apertures of said apertured disk, the exterior of the outermost spring being in communication with the interior of the casing and the interior of the innermost spring being in communicaton therewith through the said apertures provided in the rotatably located disk and the block, the under face of the former being provided with ratchet teeth engaging corresponding teeth provided upon the inner face of the latter, and means to rotate said spindle.

9. A strainer, comprising a sealed receptacle having an inlet and an outlet, a spindle rotatably mounted in and extending within the receptacle, a block carried by the receptacle, provided with cam means and affording a bearing for the spindle, means external the receptacle for rotating the spindle, a helical spring with separated convolutions and mounted about the spindle between the receptacle wall and said block, opposite sides of said spring being in communication respectively with the outlet port and the interior of the receptacle, and separated elements on the spindle one of which is attached thereto and the other bearing means adapted for engaging with said cam means, the said spring being held between the said elements with its opposite ends respectively attached thereto, whereby when the spindle is rotated in one direction, said spring is compressed and subsequently automatically released.

WALTER C. ELZE.
IRVING McDOWELL.